US006757398B2

(12) United States Patent
Foley

(10) Patent No.: US 6,757,398 B2
(45) Date of Patent: Jun. 29, 2004

(54) SYSTEM AND METHOD FOR SENSING A SOUND SYSTEM

(75) Inventor: Michael J. Foley, Newport Beach, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 433 days.

(21) Appl. No.: 09/765,741

(22) Filed: Jan. 19, 2001

(65) Prior Publication Data

US 2002/0097883 A1 Jul. 25, 2002

(51) Int. Cl.[7] .................................................. H02B 1/00
(52) U.S. Cl. .......................................... 381/123; 381/81
(58) Field of Search ............................ 381/77, 119, 80, 381/123, 81, 58, 11

(56) References Cited

U.S. PATENT DOCUMENTS 4,723,295 A * 2/1988 Kosaka ....................... 381/123
5,007,104 A * 4/1991 Brochu ....................... 381/123
5,734,729 A * 3/1998 Tran .......................... 381/94.5

* cited by examiner

*Primary Examiner*—Minsun Oh Harvey
(74) *Attorney, Agent, or Firm*—Farjami & Farjami LLP

(57) ABSTRACT

A system and method are provided for sensing a sound system. In one embodiment, a sound card or other such device is provided that includes an analog audio output system and a digital audio output system. Both the analog and digital audio output systems are coupled to a common audio output port through which either an analog or digital sound system is driven. The common audio output port provides a first line out and a second line out that may be employed to transmit the right and left channels of a stereo analog audio signal. Alternatively, one of the first and second line outs may be employed to transmit a digital audio signal, where the remaining line out is coupled to ground. Only one of the analog and digital output systems are enabled to transmit sound through the common audio output port to the respective sound system at a time. Accordingly, the present system and method are provided to determine whether an analog or digital sound system is coupled to the common audio output port.

13 Claims, 4 Drawing Sheets

SYSTEM AND METHOD FOR SENSING A SOUND SYSTEM

TECHNICAL FIELD

The present invention is generally related to the field of audio output devices and, more particularly, is related to a system and method for sensing an audio output.

BACKGROUND OF THE INVENTION

Since the early days of the record player, audio electronics has seen vast technological advancement. More recently, with the proliferation of computer technology, audio electronics has become integrated with the operation of a computer. Also, recent computer gaming software includes special sound effects that are generated in response to user input based upon information seen on a display device. Other computer software employs synthesized sound and other sound outputs and currently computers are available that can play compact disks on attached speakers, etc.

The technology employed to generate the sound has undergone a significant evolution as well. Early technology included the first stereo speaker systems that are driven by analog signals. Modern technology includes improved speaker systems and other audio equipment that are driven by analog sound signals as well as speaker systems that are driven by digital sound signals. Digitally driven systems may include multiple speaker systems that provide modem theater quality to in home sound systems. One digital interface that is commonly employed is the Sony/Phillips Digital Interface (S/PDIF) that can drive up to six different audio channels. Such sound systems may be employed in conjunction with home theater entertainment systems to watch television or movies.

Currently, computer systems may be outfitted with analog sound systems or digital sound systems to provide options for sound output in view of available audio technology to enhance the experience of the user. Unfortunately, the same computer systems may be outfitted with a number of other input/output devices such as display devices, keyboards, modems, a mouse, antenna, video cable input, printers, scanners, personal appliances, and many other devices. The proliferation of the available input/output devices generally results in a significant requirement on a computer to provide the number of input/output ports to service these various input/output devices. This can present a problem in that the corresponding physical size of a computer system becomes undesirably large.

Unfortunately, a computer system that provides both analog and digital sound output capability must include both a digital audio output port and an analog audio output port, thereby further exacerbating this problem. It may be possible to provide both analog and digital audio signals through a common audio output port. However, in such a case another problem is presented in that the computer system is not aware of whether an analog or digital signal is to be generated and transmitted through such a common audio output port.

SUMMARY OF THE INVENTION

In view of the foregoing, the present invention provides for a system and a method that are employed to detect whether an analog or digital sound system is coupled to a common audio output port provided in a computer system, stereo system, or other sound playback device. The analog sound system may be a powered stereo speaker system or other similar audio sound system. The digital sound system may include, for example, a Sony/Phillips Digital Interface (S/PDIF) receiver or other digital receiver.

According to one aspect of the present invention, a sound card or other such device is provided that includes an analog audio output system and a digital audio output system. Both the analog and digital audio output systems are coupled to a common audio output port through which either an analog or digital sound system is driven. The common audio output port provides a first line out and a second line out that may be employed to transmit the right and left channels of a stereo analog audio signal. The common audio output port also provides a common ground conductor. In this regard, the common audio output port may employ, for example, a $\frac{1}{8}^{th}$ inch mini-stereo connector or its equivalent. Only one of the analog and digital output systems are enabled to transmit sound through the common audio output port to the respective sound system at a time. Consequently, according to one aspect of the present invention, a system and method are provided to determine whether an analog or digital sound system is coupled to the common audio output port. This determination may be performed during a reset or startup phase of the operation of the computer system or stereo system, etc.

When an analog sound system is coupled to the common audio output port, the first and second line outs are both employed to relay left and right channels to the analog sound system. In contrast, when a digital sound system is coupled to the common audio output port, only one of the first and second lines out is employed to transmit a single digital signal. The remaining line out is coupled to ground.

According to the present invention, an audio output sensing system and method are employed to detect whether an analog sound system or a digital sound system is coupled to the common audio output port. In the present system, a predetermined sensing voltage is applied to the second line out. The second line out is then examined to determine the resulting voltage potential. Assuming that a connected digital sound system couples the second line out to ground, then the resulting voltage potential equals the ground potential. On the other hand, if an analog sound system is coupled to the second line out, the voltage potential on the second line out is much higher, given that the second line out is not grounded.

Thus, according to the audio output sensing system, a predetermined threshold is set somewhere between the ground potential and the highest voltage potential achieved when the sensing voltage is applied to the second line out. When the sensing voltage is applied to the second line out, if the resulting voltage potential is greater than the predetermined threshold, then the analog audio output system is enabled and the digital audio output system is disabled. On the other hand, if the resulting voltage potential is less than the predetermined threshold, then the digital audio output system is enabled and the analog audio output system is disabled. The audio output sensing system may be implemented in terms of software and general purpose hardware, dedicated hardware, or a combination of software/general purpose hardware and dedicated hardware.

The present invention may also be viewed as a method for sensing a sound system. In this regard, the method includes the steps of providing an audio output port having a first line out and a second line out, detecting an existence of a coupling between the second line out and a ground conductor, and, enabling one of an analog audio output system and a digital audio output systems based upon the existence of the coupling between the second line out and the ground conductor. The step of detecting an existence of a coupling between the second line out and a ground conductor further comprises the steps of applying a sensing voltage to the second line out, and, determining whether a voltage potential of the second line out is greater than a predetermined voltage threshold upon the application of the sensing voltage to the second line out.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
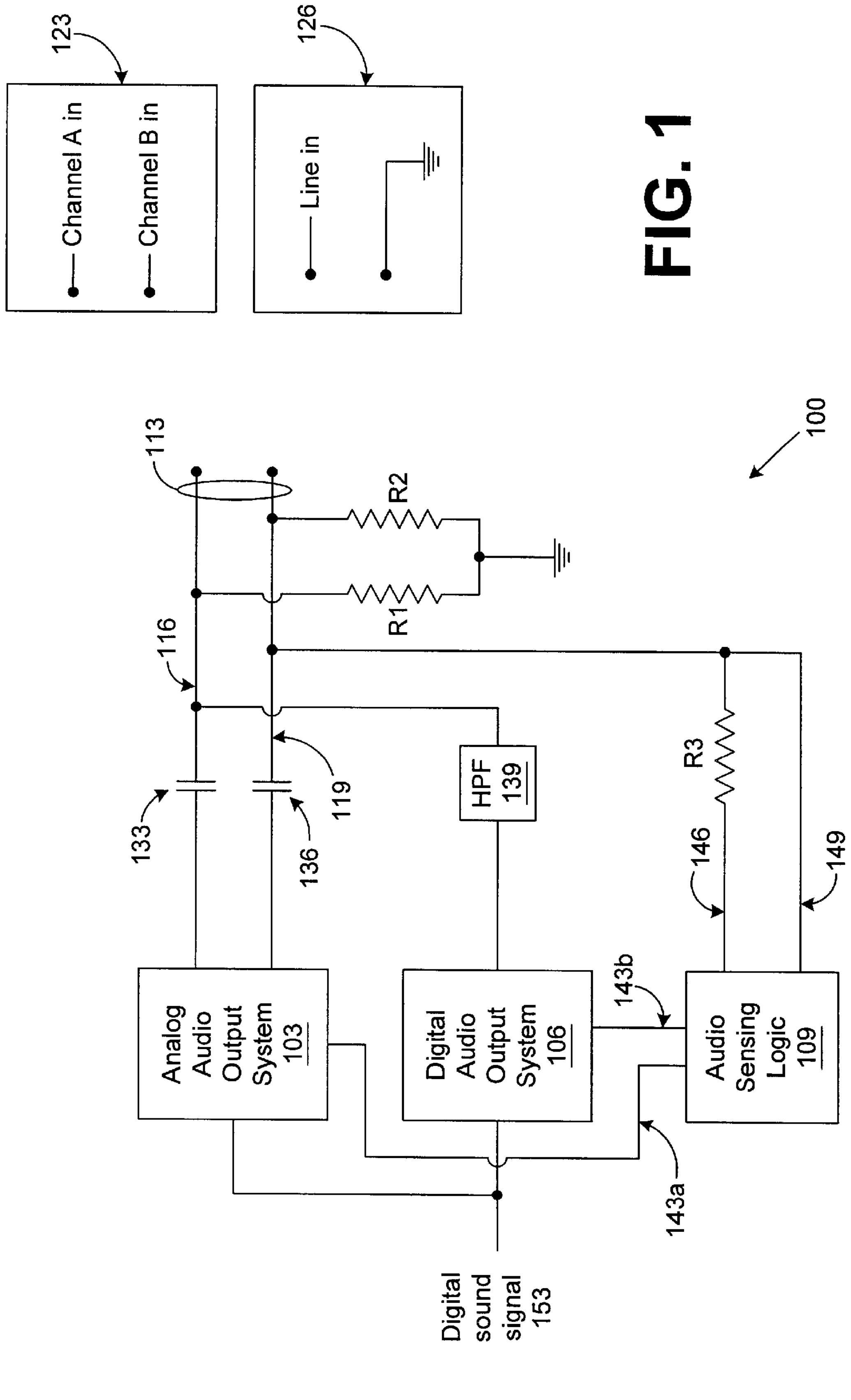
FIG. 1 is a schematic of an audio output system that employs an audio output sensing system according to an embodiment of the present invention.

With reference to FIG. 1, shown is a sound generation system 100 according to an aspect of the present invention. The sound generation system 100 includes an analog audio output system 103, a digital audio output system 106, and audio sensing logic 109. The sound generation system 100 also includes a common audio output port 113 with a first line out 116 and a second line out 119. The sound generation system 100 may be employed with a computer system or other system. Specifically, the sound generation system 100 may be included on a sound card within a computer system or other such device. Also, the analog audio output system 103 and the digital audio output system 106 may reside within one or more application specific integrated circuits (ASIC) or other configuration.

The analog audio output system 103 is employed to generate the left and right channels of an audio signal that drives an analog sound system 123. The left and right channels are transmitted via the first and second line outs 116 and 119. The analog sound system 123 may comprise powered stereo speakers or other such devices. The digital audio output system 106 is employed to generate a digital audio signal that drives a digital sound system 126. Such a digital audio signal may be transmitted using a single line with respect to ground such as the first line out 116. The digital sound system 126 may comprise, for example, a Sony/Phillips digital interface (S/PDIF) receiver or other digital receiver as is generally known by those with ordinary skill in the art.

The analog audio output system 103 is coupled to the first line out 116 and the second line out 119 by a first capacitor 133 and a second capacitor 136. The first and second capacitors 133 and 136 are employed to prevent a DC component from being transmitted to an analog sound system 123 as is generally known by those with ordinary skill in the art. The digital audio output system 106 is coupled to the first line out 116 through a high pass filter 139 as is generally known by those with ordinary skill in the art. The high pass filter 139 prevents low frequency components from reaching the digital sound system 126 as is generally understood by those with ordinary skill in the art.

The sound generation system 100 also includes a first resistor R1 and a second resistor R2 that effectively tie the first line out 116 and the second line out 119 to ground. The first and second resistors R1 and R2 are generally employed to reduce a DC level of the first and second line outs 116 and 119. This is done to reduce a potential "pop" when either the analog sound system 123 or the digital sound system 126 is first coupled to the common audio output port 113.

The audio sensing logic 109 includes enable outputs 143*a* and 143*b* that are coupled to the analog audio output system 103 and the digital audio output system 106, respectively. The enable outputs 143*a*/*b* allow the audio sensing logic 109 to enable either the analog audio output system 103 or the digital audio output system 106 for general operation. The audio sensing logic 109 also includes a sensing output 146 that is coupled to the second line out 119 through a resistor R3 and a sensing input 149 that is coupled directly to the second line out 119.

The analog audio output system 103 and the digital audio output system 106 both include an input through which a digital audio signal 153 is received. A corresponding analog or digital audio signal is generated therefrom for transmission to the analog sound system 123 or the digital sound system 126.

Next a discussion of the operation of the sound generation system 100 is provided. It is assumed that the sound generation system 100 may be a component within a computer system or other suitable system. The sound generation system 100 is configured to determine whether an analog sound system 123 or a digital sound system 126 is coupled to the sound generation system 100 through the common audio output port 113. Based on this determination, either the analog audio output system 103 or the digital audio output system 106 is enabled for operation to generate a corresponding digital or analog audio signal. The determination of whether an analog sound system 123 or a digital sound system 126 is coupled to the common audio output port 113 is made during a reset or startup sequence of the overall computer or other system as is generally understood by those with ordinary skill in the art.

To make this determination, the audio sensing logic 109 first applies a high logical voltage at the sensing output 146. Note that the high logical voltage may comprise a voltage that represents a logical "1" within a logical system as is generally known by those with ordinary skill in the art. Conversely, a low logical voltage represents a logical "0" within a logical system as is generally known by those with ordinary skill in the art.

When a high logical voltage is applied to the sensing output 146, one of two things may happen. If the analog sound system 123 is coupled to the common audio output port 113 or if no sound system 123/126 is coupled to the common audio output port 113, then the second line out 119 is not coupled directly to ground. Rather, the high logical voltage is coupled to ground predominantly through the resistor R2 that has a much higher value than the resistor R3. As a result, the application of the high logical voltage to the sensing output 146 results in a relatively high voltage on the second line out 119. This high logical voltage is sensed at the sensing input 149. Upon sensing the high logical voltage at the sensing input 149, the audio sensing logic 109 then knows that the analog sound system 123 is coupled to the common audio output port 113. In response, the audio sensing logic 109 enables the analog audio output system 103 for operation and disables the digital audio output system 106 by way of the enable outputs 143*a* and 143*b*.

Assuming, however, that the digital sound system 126 is coupled to the common audio output port 113, then the second line out 119 is coupled to ground. The ground coupling may be accomplished by coupling the second line out 119 to a ground conductor in the plug that fits into the common audio output port 113. If such is the case, then the application of the high logical voltage to the sensing output 146 results in a relatively low voltage at the second line out 119. This is because the voltage potential is lost entirely across the resistor R3. Since a low logical voltage is seen at the sensing input 149, the audio sensing logic 149 knows that the digital sound system 123 is coupled to the common audio output port 113. In response, the audio sensing logic 109 disables the analog audio output system 103 and enables the digital audio output system 106 using the enable outputs 143*a* and 143*b*.

After either the analog audio output system 103 or the digital audio output system 16 is enabled, the digital audio signal 153 received by the sound generation system 100 is processed by the enabled output system 103/106. The corresponding digital or analog audio signal generated thereby is applied to the common audio output port 113.

Figure 2:
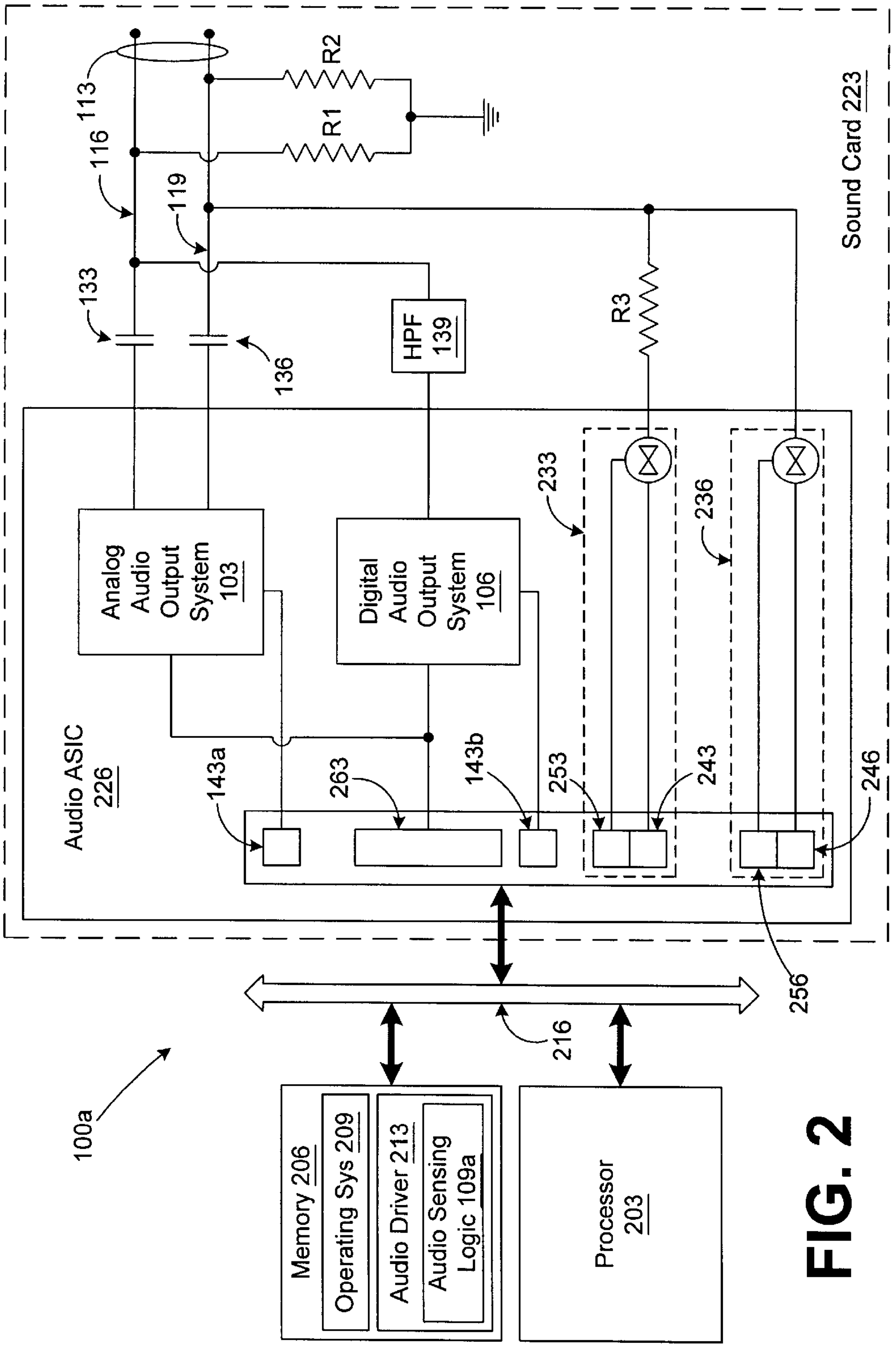
FIG. 2 is a schematic of an audio output system that illustrates a software implementation of the audio output sensing system of FIG. 1.

With reference to FIGS. 1 and 2, shown is a sound generation system 100*a* that employs software to perform the functions of the audio sensing logic 109 according to an embodiment of the present invention. The sound generation system 100*a* includes a processor 203 and a memory 206 that are included as a part of the computer system or other system as is generally known by those with ordinary skill in the art. Stored on the memory 206 and executable by the processor 203 are an operating system 209 and an audio driver 213. The audio driver 213 includes audio sensing logic 109*a*. The processor 203 is coupled to the memory 206 by a local interface 216. The local interface 216 may be, for example, a data bus with an accompanying control bus as is general understood by those with ordinary skill in the art. The sound generation system 100*a* also includes a sound card 223 that is coupled to the local interface 216 as shown. Within the sound card 223 is an audio application specific integrated circuit (ASIC) 226 that includes a number of registers.

The audio ASIC 226 includes the analog audio output system 103 and the digital audio output system 106. Also, the audio ASIC 226 includes general purpose inputs/outputs (GPIO's) 233 and 236. The GPIO 233 acts as the sensing output 146 and the GPIO 236 acts as the sensing input 149. Each of the GPIO's 233 and 236 include an input/output register 243 and 246 and corresponding configuration registers 253 and 256. The GPIO's 233 and 236 are configurable during reset to act as either an input register or an output register as is generally known by those with ordinary skill in the art. Specifically, depending on the logical value written to the configuration registers 253 and 256, the GPIO's 233 and 236 act as either an input register or an output register. The audio ASIC 226 also includes enable registers 143*a* and 143*b*. The enable register 143*a* is coupled to an enable input of the analog audio output system 103. Likewise, the enable register 143*b* is coupled to an enable input of the digital audio output system 106. By writing a logical "1" to the enable registers 143*a* and 143*b*, the analog audio output system 103 and digital audio output system 106 are enabled, respectively. The audio ASIC 223 also includes a parallel register 263 that acts as a buffer to receive the digital audio signal 153 by way of the local interface 216. The audio ASIC 223 may also include other components beyond those shown in FIG. 2 as is generally known by those with ordinary skill in the art.

With regard to the operation of the sound generation system 100*a*, the audio driver 213 is executed by the processor 203 to allow the computer system to communicate with and transmit sound using the sound card 223. The audio sensing logic 109*a* is executed by the processor 203 to sense the presence of either the analog sound system 123 or the digital sound system 126. During a reset condition, both of the GPIO's 233 and 236 are automatically configured as inputs as is generally understood by those with ordinary skill in the art.

Figure 3:
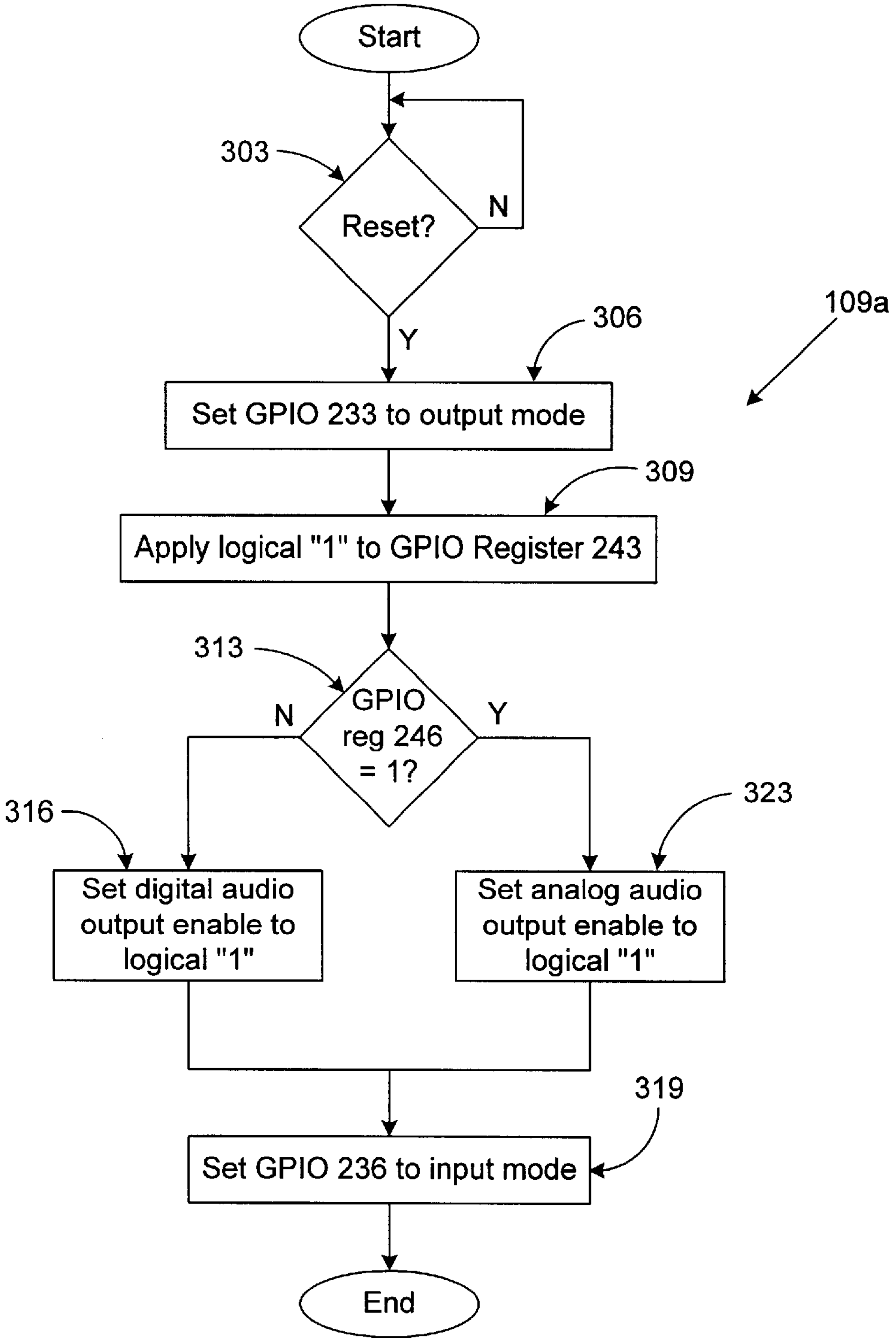
FIG. 3 is a flow chart of audio output sensing logic executed in the audio output sensing system of FIG. 2.

With reference to FIGS. 1–3, shown is a flowchart of the audio sensing logic 109*a* that is executed in the occurrence of a reset of the computer system that contains the audio driver 213. Alternatively, the flowchart of FIG. 3 may be viewed as steps implemented by the processor circuit that includes the processor 203 and the memory 206. A reset condition may occur, for example, during a start up of the computer system or at other times during the operation thereof as is generally understood by those with ordinary skill in the art. The audio sensing logic 109*a* provides a software example of the audio sensing logic 109.

The audio sensing logic 109*a* is stored in the memory 206 and executable by the processor 203 in interfacing with the various components of the audio ASIC 226. The audio sensing logic 109*a* is executed to determine whether the analog sound system 123 or the digital sound system 126 is coupled to the common audio output port 113 as discussed previously. Beginning with block 303, it is determined whether a reset condition exists in the computer system or other system. This may occur during start up or during some other time where the reset is triggered either manually or automatically. If a reset condition exists in block 303 then the audio sensing logic 109*a* moves to block 306 in which the GPIO 233 is set to output mode. This may be accomplished by writing an appropriate value to the configuration register 253. Thereafter, the audio sensing logic 109*a* moves to block 309 in which a logical "1" is applied to the I/O register 243. This causes a high logical voltage to be applied to the resistor R3 and ultimately to the second line out 119.

The audio sensing logic 109*a* then proceeds to block 313 in which the I/O register 246 of the GPIO 236 is examined to determine its value. If the logical value contained in the I/O register 246 is equal to a logical "0", then the audio sensing logic 109*a* moves to block 316 in which the enable input 143*b* is set to a high logical value to enable the digital audio output system 106. Thereafter, the audio sensing logic 109*a* moves to block 319 in which the GPIO 236 is reset to input mode to prevent interference with the second line out 119 during subsequent operation.

On the other hand, if in block 313 the logical value contained in the I/O register 246 is a logical "1", then the audio sensing logic 109*a* proceeds to block 323. In block 323 the enable register 143*a* is set to a logical "1" to enable the analog audio output system 103. Thereafter, the audio sensing logic 109a moves to block 319 to reset the GPIO 236 to input mode. Thereafter, the audio sensing logic 109a ends accordingly.

Although the audio sensing logic 109a of the present invention is embodied in software executed by general purpose hardware as discussed above, as an alternative the audio sensing logic 109a may also be embodied in dedicated hardware or a combination of software/general purpose hardware and dedicated hardware. If embodied in dedicated hardware, the audio sensing logic 109a can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 3 shows the architecture, functionality, and operation of an implementation of the audio sensing logic 109a. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow chart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present invention. Also, the flow chart of FIG. 3 is relatively self-explanatory and are understood by those with ordinary skill in the art to the extent that software and/or dedicated hardware can be created by one with ordinary skill in the art to carry out the various logical functions as described herein.

Also, the audio sensing logic 109a can be embodied in any computer-readable medium for use by or in connection with an instruction execution system. Such an instruction execution system may be a computer/processor based system or other system that can fetch or obtain the logic from the computer-readable medium and execute the instructions contained therein. In the context of this document, a "computer-readable medium" can be any medium that can contain, store, or maintain the audio sensing logic 109a for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 4:
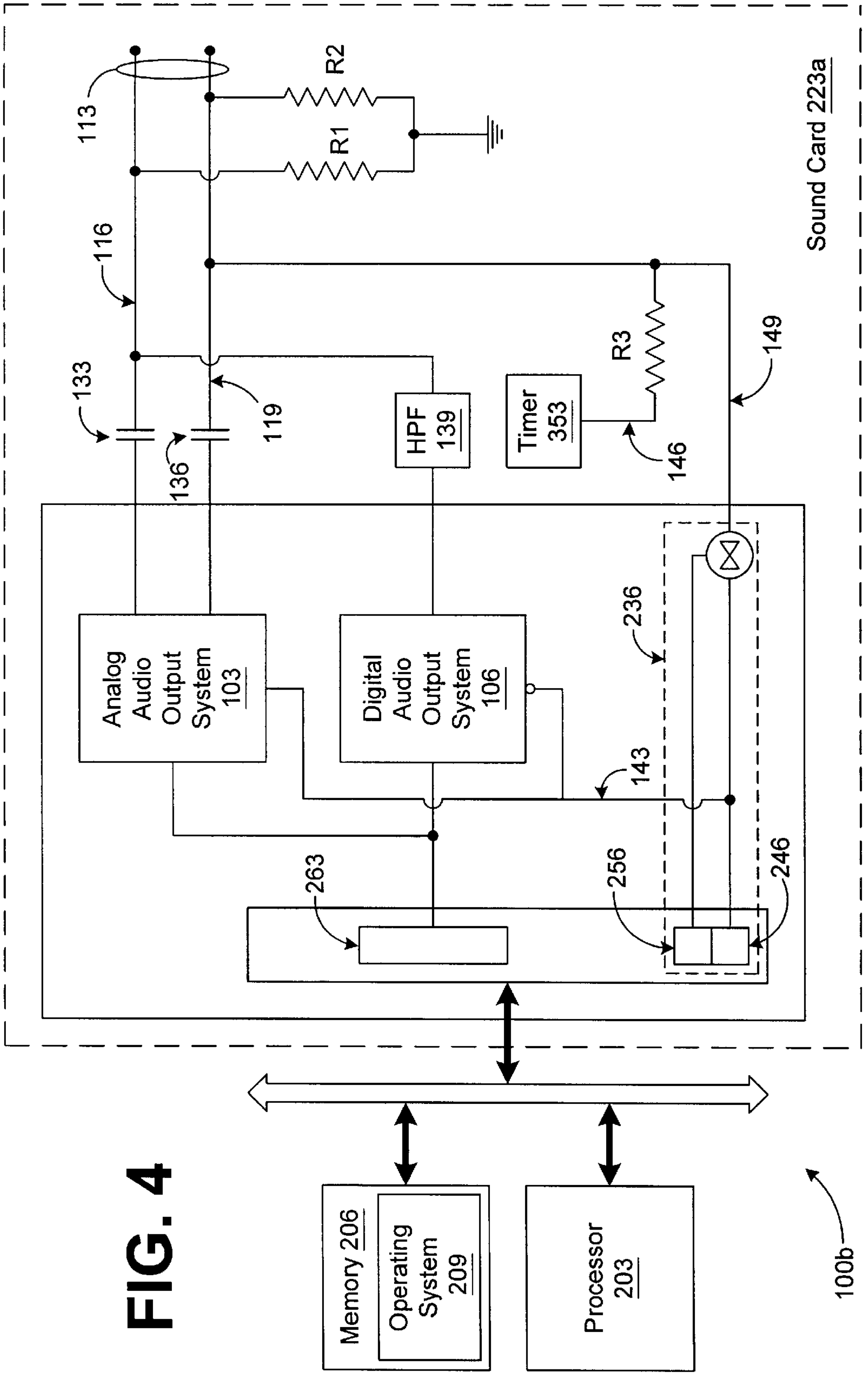
FIG. 4 is a schematic of an audio output system that illustrates an implementation of the audio output sensing system of FIG. 1 using dedicated hardware.

With reference to FIG. 4, shown is a sound generation system 100b according to another embodiment of the present invention. The sound generation system 100b provides an illustration of the audio sensing logic 109 (FIG. 1) implemented in dedicated hardware. In particular, the sound generation system 100b includes a timer 353 that generates a high logical voltage that is applied to the resistor R3. The timer 353 cycles upon the an occurrence of a reset in the adjoining computer system or other system as is generally known by those with ordinary skill in the art. The timer 353 cycles down for a predetermined period of time during which the high logical voltage is applied to the resistor R3. When the high logical voltage is applied to the resistor R3, the GPIO 236 receives either the high or low logical voltage that results on the second line out 119 as discussed previously. Note that the GPIO 236 need not be configured as it is set as an input by default. This value is then applied to the enable inputs of the analog and digital output systems 103 and 106. The digital audio output system 106 receives the value in an inverted input so as to achieve an opposite enable status from the analog audio output system 103. Note that the analog and digital audio output systems 103 and 106 latch in the enable value in the enable inputs during the time period that the timer 353 cycles down and not thereafter. This prevents unwanted voltage values from occurring at later times that are opposite those of the initial sensing period. In this manner, either the analog audio output system 103 or the digital audio output system 106 is enabled for operation.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A sensing system comprising:

an audio output port having a first line out and a second line out;

a logic circuit coupled to the second line out to detect an existence of a coupling between the second line out and a ground conductor;

an analog audio output system coupled to the first line out and the second line out; and a digital audio output system having an output channel coupled to the first line out;

wherein the logic circuit enables the digital audio output system if the logic circuit detects the existence of the coupling between the second line out and the ground conductor, and the logic circuit enables the analog audio output system if the logic circuit does not detect the existence of the coupling between the second line out and the ground conductor.

2. The system of claim 1, wherein the logic circuit is coupled to the second line out by a sensing output, wherein the existence of the coupling between the second line out and the ground conductor is detected by a voltage potential on the second line out that is lower than a predetermined voltage threshold when a predetermined sensing voltage is applied to the sensing output.

3. The system of claim 1, wherein the logical circuit further comprises:

a sensing voltage generation circuit coupled to the second line out;

a first enable input in the analog audio output system coupled to the second line out; and a second enable input in the digital audio output system coupled to the second line out, wherein the first and second enable inputs are opposing inputs.

4. The system of claim 1, wherein the logic circuit further comprises:

a processor coupled to a local interface;

a memory coupled to a local interface;

a first general purpose input/output (GPIO) and a second GPIO coupled to the local interface, the first GPIO being coupled to the second line out and the second GPIO being coupled to the second line out;

audio sensing logic stored on the memory and executable by the processor, the audio sensing logic comprising:

logic to drive the first GPIO to a predetermined output voltage potential;

logic to detect an input voltage potential at the second GPIO;

logic to enable the analog audio output system if the input voltage potential is greater than a predetermined voltage threshold; and logic to enable the digital audio output system if the input voltage potential is less than the predetermined voltage threshold.

5. The system of claim 2, wherein the sensing output is coupled to the second line out through a resistor.

6. The system of claim 4, wherein the logical circuit further comprises:

a first enable input in the analog audio output system, the first enable input being coupled to the local interface;

a second enable input in the digital audio output system, the second enable input being coupled to the local interface;

wherein the logic to enable the analog audio output system further comprises logic to apply an enabling value to the first enable input; and wherein the logic to enable the digital audio output system further comprises logic to apply an enabling value to the second enable input.

7. A method for sensing a sound system, the method comprising the steps of:

providing an audio output port having a first line out and a second line out;

detecting an existence of a coupling between the second line out and a ground conductor by applying a sensing voltage to the second line out, and determining whether a voltage potential of the second line out is greater than a predetermined voltage threshold upon the application of the sensing voltage to the second line out; and enabling one of an analog audio output system and a digital audio output systems based upon the existence of the coupling between the second line out and the ground conductor.

8. The method of claim 7, further comprising the steps of:

coupling the analog audio output system to the first line out and the second line out; and coupling the output channel of a digital audio output system to the first line out.

9. The method of claim 7, wherein the logic circuit further comprising the steps of:

enabling the analog audio output system if the voltage potential of the second line out is greater than the predetermined voltage threshold; and enabling the digital audio output system if the voltage potential of the second line out is less than the predetermined voltage threshold.

10. The method of claim 8, further comprising the steps of:

generating the sensing voltage with a sensing voltage circuit;

coupling a first enable input in the analog audio output system to the second line out; and coupling a second enable input in the digital audio output system to the second line out, wherein the first and second enable inputs are opposing inputs.

11. A sensing system comprising:

an analog audio output system;

a digital audio output system;

an audio output port having a first line out and a second line out;

a sensing input coupled to the second line out;

a sensing output coupled to the second line out; and a processor configured to drive the sensing output to a predetermined output voltage potential, to detect an input voltage potential at the sensing input, to enable the analog audio output system if the input voltage potential is greater than a predetermined voltage threshold, and to enable the digital audio output system if the input voltage potential is less than the predetermined voltage threshold.

12. The system of claim 11, wherein the sensing output is coupled to the second line out through a resistor.

13. The system of claim 11, wherein the analog audio output system is coupled to the first line out and the second line out, and the digital audio output system is coupled to the first line out.

* * * * *